(12) United States Patent
Coker et al.

(10) Patent No.: US 10,965,467 B1
(45) Date of Patent: Mar. 30, 2021

(54) REVERSIBLE HASH GENERATORS FOR PAIRS OF COMPLEMENTARY SEQUENCES

(71) Applicant: OmniTier Storage, Inc., Milpitas, CA (US)

(72) Inventors: Jonathan Darrel Coker, Rochester, MN (US); Travis Roger Oenning, Rochester, MN (US); Balamurugan Anandan, Los Angeles, CA (US)

(73) Assignee: OmniTier Storage, Inc., Milpitas, CA (US)

( * ) Notice: Subject to any disclaimer, the term of this patent is extended or adjusted under 35 U.S.C. 154(b) by 0 days.

(21) Appl. No.: 17/069,471

(22) Filed: Oct. 13, 2020

(51) Int. Cl.
  *H04L 9/32* (2006.01)
  *G06N 3/12* (2006.01)
  *H04L 9/08* (2006.01)

(52) U.S. Cl.
  CPC ........... *H04L 9/3236* (2013.01); *G06N 3/123* (2013.01); *H04L 9/0866* (2013.01)

(58) Field of Classification Search
  CPC ...... H04L 9/3236; H04L 9/0866; G06N 3/123
  See application file for complete search history.

(56) References Cited

U.S. PATENT DOCUMENTS

| | | | | |
|---|---|---|---|---|
| 9,942,206 | B1* | 4/2018 | Miller | H04L 9/3239 |
| 10,303,382 | B1* | 5/2019 | Chu | G06F 12/126 |
| 10,447,661 | B1* | 10/2019 | Miller | H04L 9/0866 |
| 2005/0182946 | A1* | 8/2005 | Shatford | H04L 9/0643 |
| | | | | 713/185 |
| 2006/0101039 | A1* | 5/2006 | Huber | H04L 63/145 |
| 2010/0306294 | A1* | 12/2010 | Schneider | G06F 7/58 |
| | | | | 708/250 |

OTHER PUBLICATIONS

James L. Massey, Reversible Codes, Information and Control, Sep. 1964, pp. 369-380, vol. 7, No. 3.

\* cited by examiner

*Primary Examiner* — J. Brant Murphy
(74) *Attorney, Agent, or Firm* — Van Pelt, Yi & James LLP

(57) ABSTRACT

A first string, having a first string value, that is associated with a sample set of material is received where a second string, having a complementary value relative to the first string value, is also associated with the sample set of material. A reversible hash generator is used to generate a determinative hash using the first string value, where a second hash, corresponding to the second string, is able to be determined directly from the determinative hash and without the reversible hash generator processing the complementary value of the second string. It is determined whether at least one of the first string or the second string is stored in a memory using the determinative hash.

20 Claims, 7 Drawing Sheets

US 10,965,467 B1

REVERSIBLE HASH GENERATORS FOR PAIRS OF COMPLEMENTARY SEQUENCES

BACKGROUND OF THE INVENTION

Some storage systems which store biological and/or genetic information use a hash table to quickly determine whether a piece of biological and/or genetic information has already been stored in a system. For example, a hash is generated from a string of RNA or DNA information and that hash is looked up in a hash table in order to quickly determine whether that string has already been stored. It would be desirable if such storage systems could be improved so that they (as an example) use less storage and/or other processing resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of systems that more efficiently generate and use hashes are described herein. For example, the system may be a system that analyzes, stores, manages, and/or otherwise handles strings that are associated with sample sets of material (e.g., strings of DNA or RNA). In some embodiments, a reversible hash generator is used to generate a determinative hash from a string of DNA or RNA as part of performing a hash table lookup to determine whether a string and/or its counterpart string (e.g., a second string that is the reverse complement of the first string) is already stored or whether it needs to be added to storage. In some embodiments, a reversible Bose-Chaudhuri-Hocquenghem (BCH) encoder is used to generate a determinative hash as part of a hash table lookup. As will be described in more detail below, the hash generation techniques described herein improve performance by reducing the amount of memory and/or other computing resources used compared to existing hash generation techniques.

Figure 1:
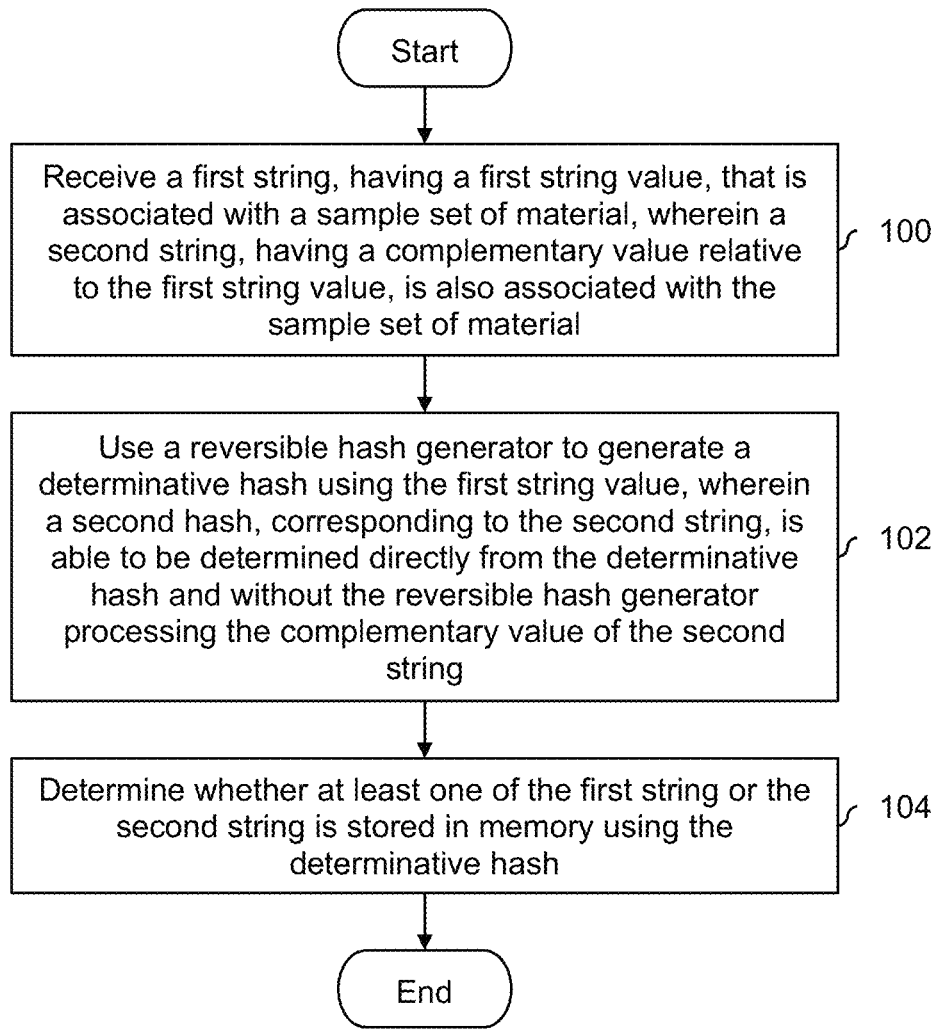
FIG. 1 is a flowchart illustrating an embodiment of a process to generate a determinative hash using a reversible hash generator as part of determining whether at least one of a first string or a second string is stored in memory.

FIG. 1 is a flowchart illustrating an embodiment of a process to generate a determinative hash using a reversible hash generator as part of determining whether at least one of a first string or a second string is stored in memory. In some embodiments, the process is used to determine if a string or other piece of data (e.g., for which a determinative hash is generated) and/or a complementary string (e.g., which is informationally equivalent to a corresponding string but not identical at the symbol level) has been previously stored and/or otherwise encountered. In some embodiments, the process of FIG. 1 is performed by a hash table controller that generates a canonized hash (e.g., from the determinative hash) to send to the hash table as part of a hash table lookup.

At 100, a first string, having a first string value, that is associated with a sample set of material is received, wherein a second string, having a complementary value relative to the first string value, is also associated with the sample set of material. In some embodiments, the first string and second string are associated with biological and/or genetic material (e.g., the strings comprise strings of DNA or RNA).

In some embodiments, the second string is (or includes) a reverse complement of the first string.

At 102, a reversible hash generator is used to generate a determinative hash using the first string value, wherein a second hash, corresponding to the second string, is able to be determined directly from the determinative hash and without the reversible hash generator processing the complementary value of the second string. For example, other types of hash generators do not generate hashes that are determinative (i.e., from which a second hash can be directly computed or otherwise determined). With other hash generators, if the (e.g., non-determinative) hash for a first string is known, there is no way to generate the second hash for the second, complementary string directly from the first hash for the first string (and vice versa). There is, in other words, no determinative relationship between the first hash for the first string and the second hash for the second, complementary string and vice versa.

In contrast, a reversible hash generator is constrained or otherwise configured to generate determinative hashes where, if given the hash for one string, the second hash for the second, complementary string can be directly generated from the first hash for the first string (e.g., without having to run the second, complementary string through the hash generator). In other words, there exists some function $f_{hash2hash}$ which can generate a second hash from a first hash (e.g., hash $2=f_{hash2hash}$(hash 1)). The converse also holds true (i.e., the hash for the first string can be generated directly from the hash for the second string without having the first string be processed by the hash generator). Some benefits associated with reversible hash generators and determinative hashes are described in more detail below.

At 104, it is determined whether at least one of the first string or the second string is stored in memory using the determinative hash. For example, strings of RNA or DNA may be stored in a relatively large and/or relatively slow storage device while corresponding hashes are stored separately in a smaller and/or faster hash table. In some embodiments, a determinative hash is used to generate a canonized hash and the canonized hash is used to perform a hash table lookup to determine if a string of DNA or RNA (or its informationally-equivalent counterpart string) is already stored in the storage for strings. If not already stored (e.g., as determined by the hash table lookup), one or both of the strings in a pair are then accordingly stored.

In some embodiments, a determinative hash (or a canonized hash generated from a determinative hash) is not necessarily used to determine whether or not to store a string but rather for some other check. For example, strings of DNA or RNA may be analyzed or otherwise ingested by a time-consuming and/or expensive analytic or diagnostic process and the determinative hash is used to check a hash table to determine whether a given string of DNA or RNA (or its informationally-equivalent counterpart) has already been analyzed or otherwise ingested by the process. The string(s) is/are then accordingly analyzed or processed (or not) depending upon the decision or check. These are merely some examples and are not intended to be limiting.

To help illustrate FIG. 1, the following figures show an example first string and counterpart second string that may be processed by FIG. 1 and an example block diagram which performs the process of FIG. 1.

Figures 2, 3:
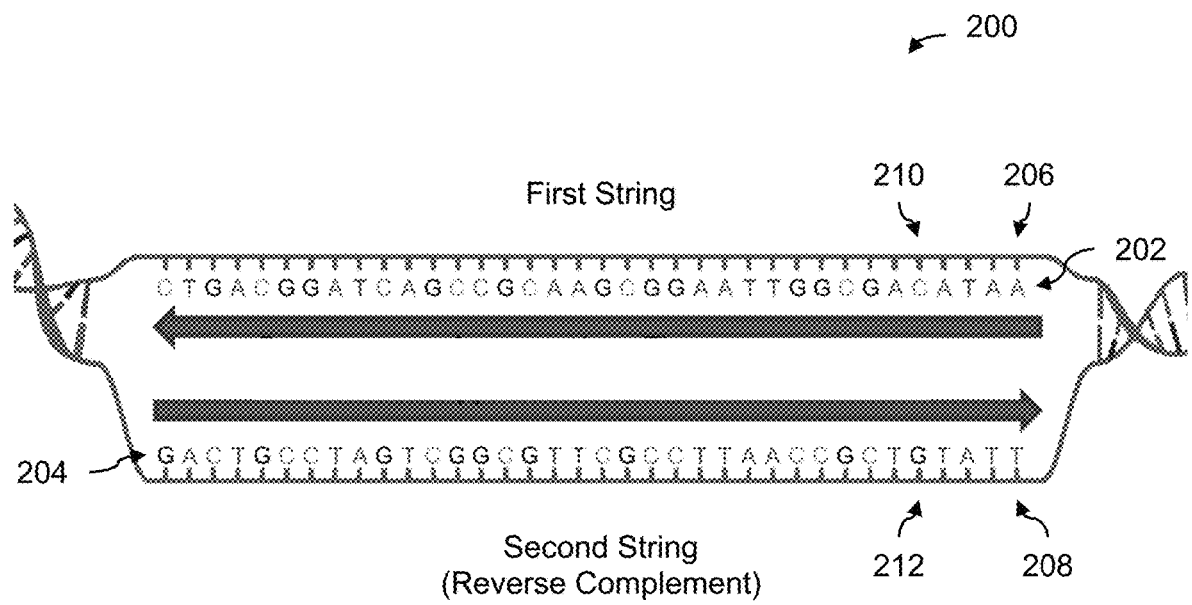
FIG. 2 is a diagram illustrating an embodiment of complementary strings associated with a sample set of biological and/or genetic material.
FIG. 3 is a table illustrating an embodiment of a mapping of DNA nucleobases to binary representations.

FIG. 2 is a diagram illustrating an embodiment of complementary strings associated with a sample set of biological and/or genetic material. In this example, the sample set of material (200) comprises DNA. In some other embodiments, the sample set of material comprises some other type of biological and/or genetic material or information, such as RNA.

In this example, the sample set of DNA (200) includes two strands, sequences, and/or strings: a first string (202) and a second string (204). Each string has an ordering, sequence, or direction associated with it. In this particular example, the first string (202) goes from right-to-left whereas the second string (204) goes from left-to-right. In other words, in this example, the second string (204) is reversed relative to the first string (202) because they have different or opposing directions or orderings. Returning briefly to FIG. 1, in some embodiments, the second string (e.g., recited in step 100) is both complementary and reversed relative to the first string, whereas in some other embodiments the second string is complementary but has the same ordering or direction (i.e., is not reversed).

In the example of FIG. 2, a property of DNA is that the two strings (202 and 204) contain identical biological and/or genetic information, even if they are not identical at the symbol or nucleobase level. For example, at the symbol or nucleobase level, each element in the first string (202) will have a complementary element in a corresponding position in the second string (204). For example, the first nucleobase (206) going from right-to-left in the first string (202) is an A (i.e., adenine). The complementary nucleobase to A is T (i.e., thymine) and vice versa and therefore the last nucleobase (208) going from left-to-right in the second string (204) is a T. Similarly, the fifth nucleobase (210) in the first string (202) is a C (i.e., cytosine) and therefore the fifth-to-last nucleobase (212) in the second string (204) is the complementary nucleobase G (i.e., guanine) where C and G are complementary to each other. Therefore, if one string is known or otherwise available, the other string can be determined and the two strings are identical with respect to the information they contain even though they are not identical at the symbol level.

To support convenient digital storage and/or processing, each of the nucleobases (i.e., G, C, T, and A) in the exemplary strings is mapped to a two-bit binary representation. The following example describes one such mapping.

FIG. 3 is a table illustrating an embodiment of a mapping of DNA nucleobases to binary representations. In the table (300), four nucleobases or symbols (G, C, T, and A) are mapped to exemplary two-bit binary representations. In this example, G is mapped to 00 (see row 302), C is mapped to 11 (see row 304), T is mapped to 01 (see row 306), and A is mapped to 10 (see row 308).

A benefit to the mapping shown is that each nucleobase or symbol can easily be transformed into its complement by performing a bit-wise exclusive OR (XOR) with 11. For example, the value for G is 00 which when bit-wise XORed with 11 produces 11 which is the binary representation for C, the complement of G. Similarly, the value for T is 01 which when bit-wise XORed with 11 produces 10 which is A, the complement of T.

More generally and/or formally, any (e.g., binary) mapping which correctly complements an (input) character or symbol by the addition of a constant in the relevant Galois Field (e.g., in this example there are four symbols or elements so it is GF(4)) is acceptable.

Figure 4A:
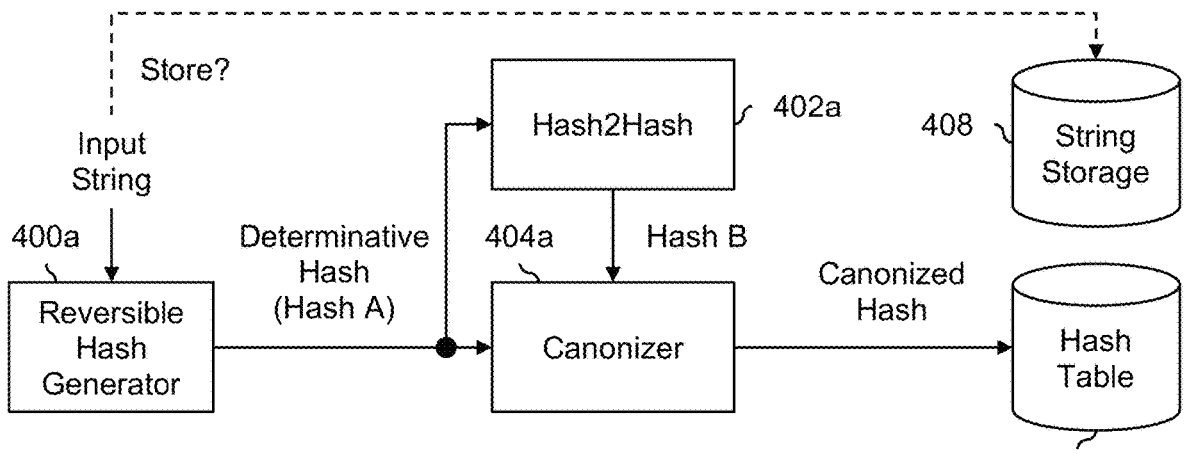
FIG. 4A is a block diagram illustrating an embodiment of a system which uses a reversible hash generator to perform a hash table lookup.

FIG. 4A is a block diagram illustrating an embodiment of a system which uses a reversible hash generator to perform a hash table lookup. In the example shown, a hash table (406a) is used to store hashes that are associated with strings or sequences from some sample set of material (e.g., biological and/or genetic information, such as DNA or RNA).

In this example, there is a second (e.g., slower and/or larger-capacity) storage device (i.e., the string storage (408)) which is used to store one or both of the strings and which is separate from the hash table (406a). By storing only hashes on the hash table (406a), this may enable the system to more quickly determine whether a hash (and correspondingly, either or both of a pair of strings of biological and/or genetic material) has been previously stored or otherwise encountered. In this example application, canonized hashes are used to determine whether a string of DNA and/or its counterpart string has already been stored in the string storage (408) and therefore whether or not that string (and/or its counterpart string) needs to be stored or does not need to be stored.

To generate a canonized hash, an input string is passed to a reversible hash generator (400a) which generates a determinative hash (also referred to in the figure as hash A) from the value of the input string.

The hash2hash block (402a) generates hash B (e.g., corresponding to the complementary string of the input string) directly from the determinative hash (i.e., hash $B = f_{hash2hash}(hash\ A)$). In this example, the hash2hash block (402a) reverses and complements the determinative hash that is input to the hash2hash block (402a). For example, the hash2hash block (402a) may include a buffer (not shown) and as the bits or symbols of hash A are input into the hash2hash block (402a), those bits or symbols are stored in the buffer. Once the last bits or symbol of hash A is stored in the buffer, hash A is read out of the buffer in last-in, first-out order and complemented (e.g., by performing a bit-wise exclusive OR operation per FIG. 3) so that the reverse complement of hash A (i.e., hash B) is output. If some other hash2hash function is used, that process would be performed in the hash2hash block (402a).

The canonizer (404a) inputs hash A from the reversible hash generator (400a) and the hash B from the hash2hash block (402a) and outputs a canonized hash. The canonizer (404a) outputs the same value given a pair of inputs regardless of the ordering of the inputs to the canonizer (i.e., canonizer(hash A, hash B)=canonizer(hash B, hash A)). The canonized hash is passed to a hash table (406a) to perform a hash lookup to determine if the input string (e.g., the first string (202) in FIG. 2) and/or its counterpart string (e.g., the second string (204) in FIG. 2) has previously been encountered, processed, and/or stored by the system. Conceptually, the canonizer ensures that regardless of whether an input string or its counterpart string is input, the same canonized hash will be generated for both strings and thus the same canonized hash will be used to perform the hash lookup.

In some embodiments, the canonizer (404a) performs a selection where the same value is selected regardless of the order of inputs (e.g., select(hash A, hash B)=select(hash B, hash A)). For example, the max operation (which selects the larger of the two inputs) will always select the same input regardless of the order of the inputs. In some embodiments, using a selection operation in the canonizer is desirable because it preserves some or all of the lookup and/or distribution properties of hashes (e.g., minimizing or otherwise reducing the likelihood of a hash collision). In some embodiments, a new output is synthesized that does not match either of the inputs. For example, the canonizer (404a) may combine the two inputs (e.g., add and/or bit-wise XOR the two inputs).

In this particular example, pairs of strings are expected to be reverse complements of each other and the system accordingly configured. It is noted that the techniques described here may be adapted for other embodiments and/or configurations where (as an example) the system expects pairs of strings to be complements of each other but with the same direction or ordering (i.e., the strings are complementary but not reversed).

The following figures show the exemplary system processing counterpart strings of DNA.

Figure 4B:
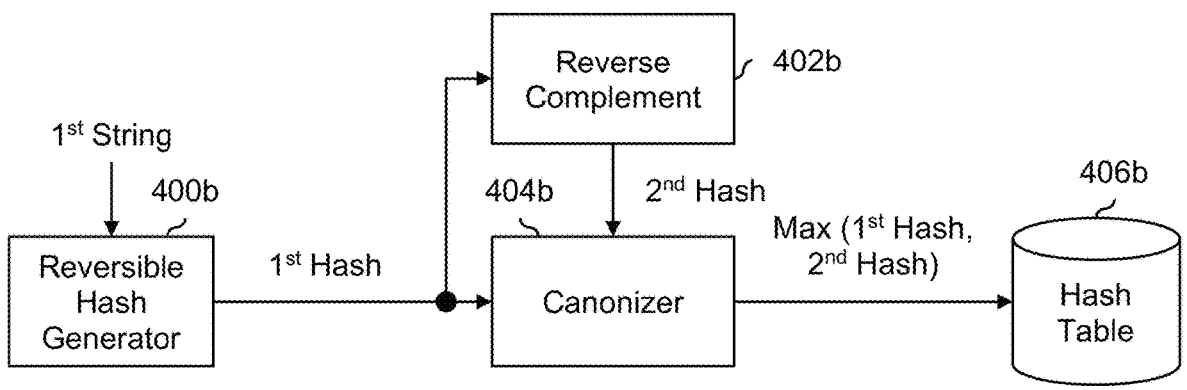
FIG. 4B is a block diagram illustrating an embodiment of a system which uses a reversible hash generator to perform a hash table lookup where a first string is input to the system.

FIG. 4B is a block diagram illustrating an embodiment of a system which uses a reversible hash generator to perform a hash table lookup where a first string is input to the system. In this example, a first string, such as the first DNA string (202) from FIG. 2, is input to the exemplary system. The reversible hash generator (400b) generates a first hash (i.e., hash 1) from the first string. The reverse complement block (402b) generates a second hash (i.e., hash 2) from the first hash where the second hash corresponds to the second string (i.e., string 2). In this example, the canonizer (404b) performs a max operation and selects the maximum of either the first hash or the second hash and uses that to perform a lookup in the hash table (406b). If the canonized hash (i.e., max(hash 1, hash 2)) is located in the hash table, then the first string and the second string do not need to be stored because the first string (and/or the informationally-equivalent second string) has already been stored by the system. Otherwise, the first string and/or the informationally-equivalent second string is/are stored.

Figure 4C:
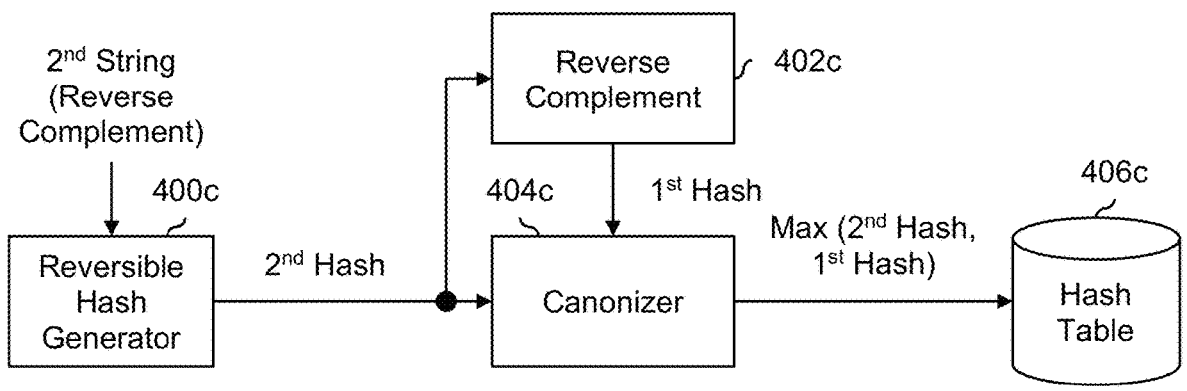
FIG. 4C is a block diagram illustrating an embodiment of a system which uses a reversible hash generator to perform a hash table lookup where a second string is input to the system.

FIG. 4C is a block diagram illustrating an embodiment of a system which uses a reversible hash generator to perform a hash table lookup where a second string is input to the system. In this example, the second string is a reverse complement of the first string (see, e.g., FIG. 2). The reversible hash generator (400c) generates a second hash from which the reverse complement block (402c) directly generates the first hash. The canonizer (404b) in FIG. 4B and the canonizer (404c) in FIG. 4C have the same inputs but in opposite order or orientation. Regardless of the order or orientation of the inputs, the canonizer will select the same hash, in this example, the maximum of either the first hash or the second hash. Thus, the same canonical hash value is used to perform a lookup in the hash table (406c) regardless of whether the first string is processed by the exemplary system (see, e.g., FIG. 4B) or the counterpart second string is processed by the exemplary system (see, e.g., FIG. 4C).

One benefit to the system shown here is that less memory is required. For example, some other hash generation systems have an input buffer that buffers the input string. From this buffer, the second and complementary string is generated (e.g., by reading the buffer in last-in, first-out order and complementing the values read out). As such, the (input) buffer needs to be long enough to store the entire string being processed. The length of a hash is shorter than the length of a corresponding string and therefore a buffer in a hash2hash block (e.g., 402a in FIG. 4A) will correspondingly be smaller than an input buffer which has to store a string of DNA or RNA.

Another benefit to the system shown is that there may be a net reduction in the amount of logic or hardware (e.g., which corresponds to lower power consumption and/or a smaller, less expensive FPGA or ASIC). For example, other hash generation systems include two copies or instantiations of the hash generator: one for the input string and the other for the complementary string (e.g., which is read from the input buffer with complements applied). This architecture in at least some cases may be result in a net reduction in logic or hardware.

As shown in FIGS. 4A-4C, in some embodiments, a hash table controller is configured to determine whether at least one of a first string or a second string is stored in a memory (e.g., the string storage (408)) using the determinative hash, including by: generating a canonized hash, having a canonized hash value, based at least in part on the determinative hash, where the canonized hash value is the same value for the first string and the second string, as well as performing a hash table lookup, including by sending the canonized hash to the hash table.

FIGS. 4A-4C also show that in some embodiments, generating the canonized hash includes: generating, directly from the determinative hash, a second hash that corresponds to the second string and using the determinative hash and the second hash to generate the canonized hash.

In some embodiments, a reversible BCH encoder is used to generate canonized hashes which are used in a hash table lookup. The following figures show some examples.

Figure 5:
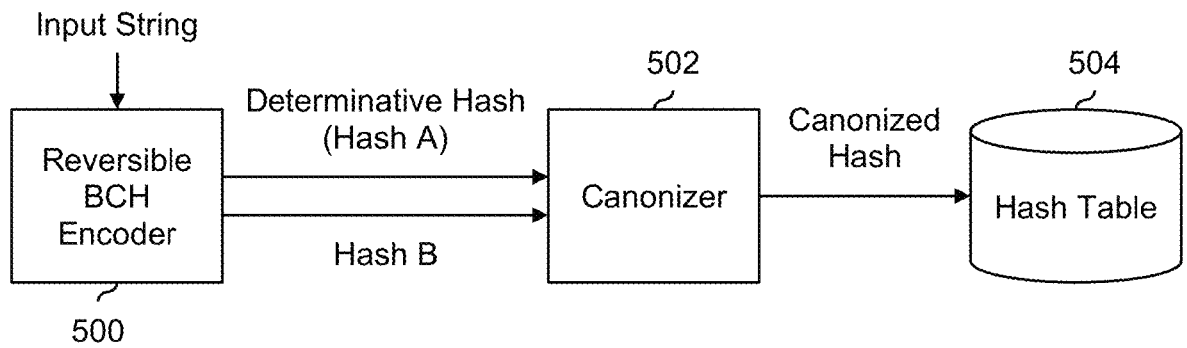
FIG. 5 is a block diagram illustrating an embodiment of a system which uses a reversible BCH encoder to generate a determinative hash as part of performing a hash table lookup.

FIG. 5 is a block diagram illustrating an embodiment of a system which uses a reversible BCH encoder to generate a determinative hash as part of performing a hash table lookup. In this example, the reversible BCH encoder (500) includes and/or is equivalent to the reversible hash generator (400a-400c) from FIGS. 4A-4C and the hash2hash block (402a-402c) from FIGS. 4A-4C. A reversible BCH encoder is characterized by a symmetric generator polynomial, such as the exemplary generator polynomial:

$$g(x)=x^{17}+x^{16}+x^{15}+x^{13}+x^{12}+x^{11}+x^9+x^8+x^6+x^5+x^4+x^2+x^1+1$$

which is a BCH(255, 238) code that inputs a 238-symbol DNA string and generates a 17-symbol parity in GF(4) space (e.g., where each symbol or nucleobase is mapped to the two-bit binary representation shown in FIG. 3). Examples described below will go into more detail about how the determinative hash (also referred to as hash A) and hash B can be obtained or otherwise generated from the parity that is output to a reversible BCH encoder.

The two hashes are passed from the reversible BCH encoder (500) to the canonizer (502) which outputs a canonized hash so that (as described above) the same canonized hash value is used to perform the lookup in the hash table (504) for both a (first) string or its counterpart second string.

A benefit to using a reversible BCH encoder to implement a reversible hash generator is that reversible BCH codes are well understood and/or relatively easy to design. For example, whereas some other codes are constrained to certain payload and/or parity lengths, it may be relatively easy to design reversible BCH codes that have certain desired payload and/or parity lengths whereas some other codes are not so amenable. Another benefit is that hardware implementations of reversible BCH encoders may be relatively straightforward, small, and/or fast. For example, as will be described in more detail below, a reversible BCH encoder may be implemented using adders and registers and avoids more complex and/or slower operations or hardware.

As shown in this example, in some embodiments, using a reversible hash generator to generate a determinative hash (e.g., at step 102 in FIG. 2) includes using a reversible BCH encoder that generates a parity, where the determinative hash is based at least in part on the parity.

Figure 6:
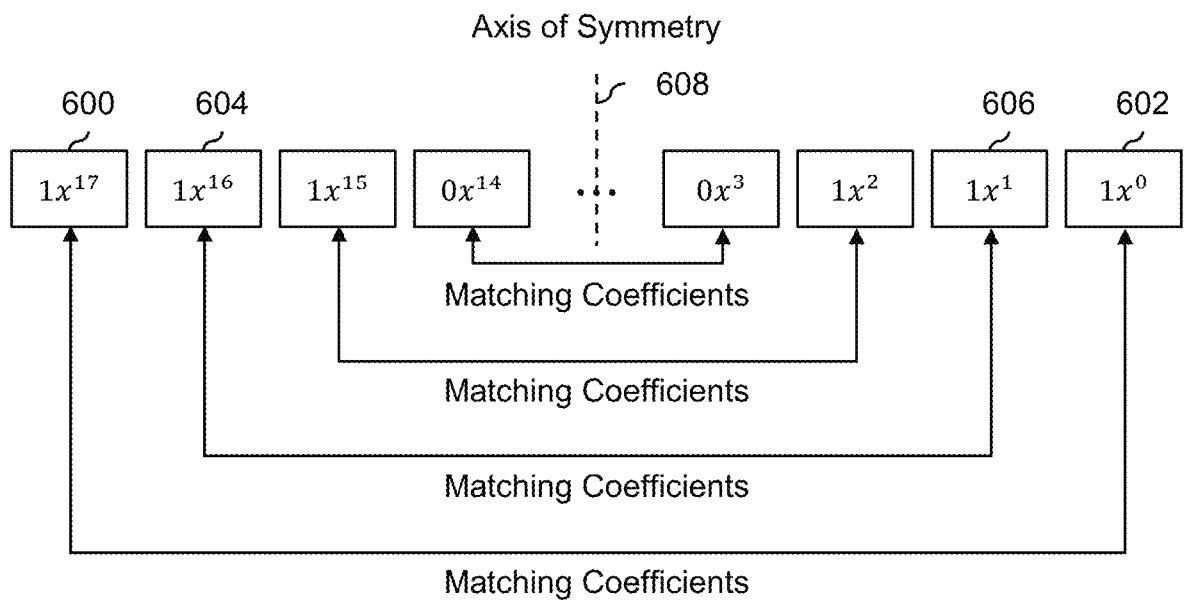
FIG. 6 is a diagram illustrating an embodiment of the symmetric nature of a generator polynomial associated with a reversible BCH encoder.

FIG. 6 is a diagram illustrating an embodiment of the symmetric nature of a generator polynomial associated with a reversible BCH encoder. In this example, the terms (e.g., the largest term (600), the smallest term (602), and so on) of the exemplary symmetric generator polynomial described above are shown, including terms with coefficients of zero. As shown here, the largest term (600) with respect to the power or exponent has a coefficient of 1 which matches the coefficient of the smallest term (602). Similarly, the second-largest term (604) has a coefficient of 1 which matches the coefficient of the second-smallest term (606) and so on. Conceptually, if the terms of the generator polynomial are sorted in descending (ascending) order and an axis of symmetry (608) is drawn down the middle of the generator polynomial, the coefficients are symmetric about the axis of symmetry.

It is noted that all of the coefficients in the exemplary BCH(255, 238) generator polynomial described above are either a 1 or a 0. As will be described in more detail below, this eliminates the need to multiply some or all of the terms of the parity from which the first hash and the second hash are obtained and in turn which are used to generate the canonized hash, simplifying the design.

Figure 7:
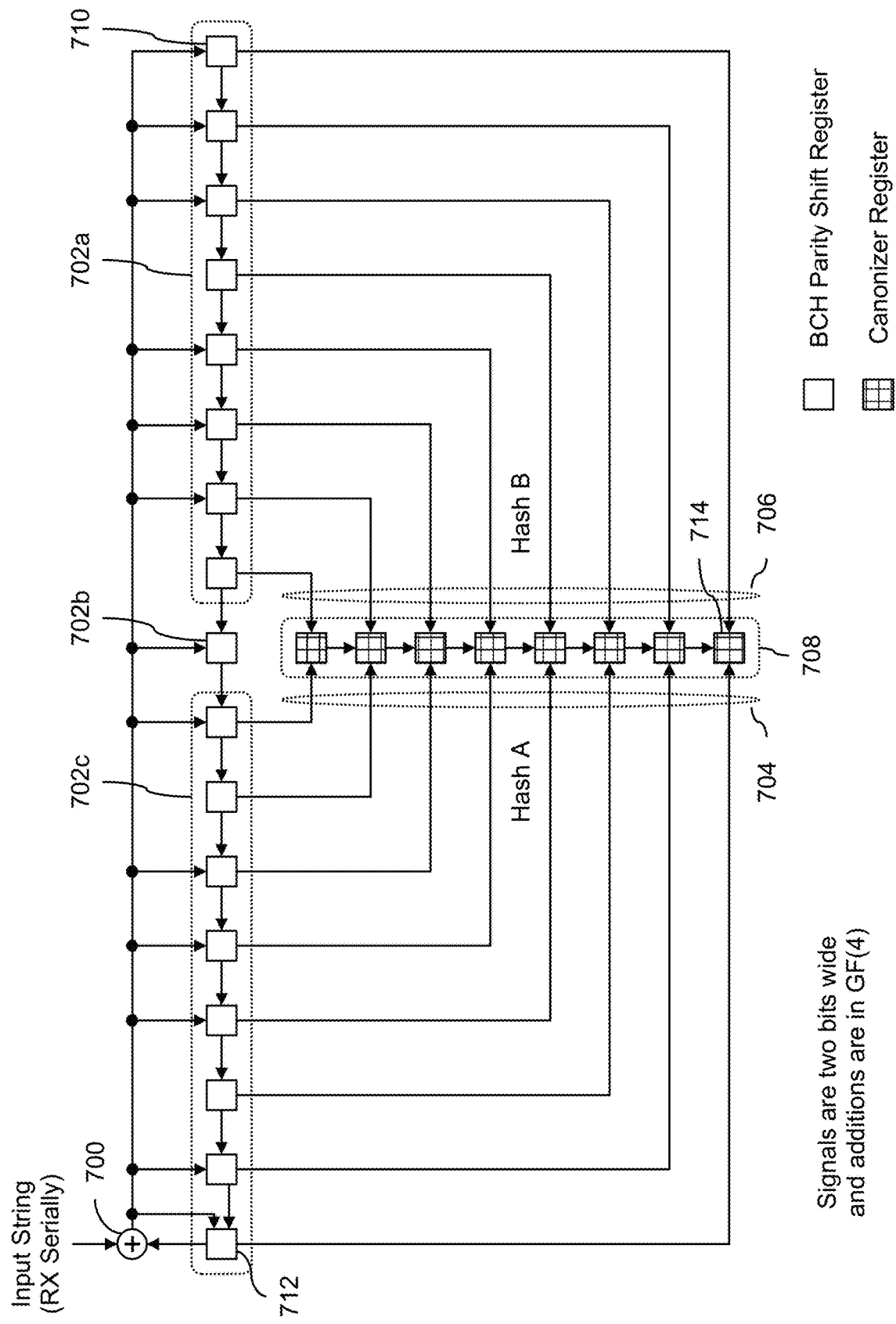
FIG. 7 is a block diagram illustrating an embodiment of a reversible BCH encoder and canonizer.

FIG. 7 is a block diagram illustrating an embodiment of a reversible BCH encoder and canonizer. In some embodiments, the reversible hash generator with reversible BCH encoder (500) and canonizer (502) in FIG. 5 is implemented as shown. In this example, the BCH encoder is associated with a BCH(255, 238) code. As such, 238 symbols are input or otherwise ingested in order to generate 17 symbols of parity. In this example, all signals are two bits wide and all additions are performed in GF(4), for example implemented as a bitwise XOR of the two, 2-bit inputs being added.

In this example, the input string is received serially (i.e., one symbol at a time). As such, at the first clock cycle, the first symbol of the input string is observed at the input of the adder (700). At the second clock cycle, the second symbol of the input string is observed at the input of the adder (700) and so on. The output of the adder (700) is input to the first BCH parity (shift) registers (710), as well as select ones of the upstream shift registers (702a), select ones of the center shift register (702b), and select ones of the downstream shift registers (702c)). The taps or connections between the output of the adder (700) and select BCH parity shift registers are dictated by the coefficients of the symmetric BCH generator polynomial (e.g., a connection exists if the corresponding coefficient is a 1 and no connection exists if the corresponding coefficient is a 0).

The BCH parity shift registers (702a-702c) in this example are two-bit registers (e.g., to handle the size of one symbol) with input adders. To more clearly illustrate the symmetrical nature of the system, each BCH parity shift register (except for the center shift register (702b)) is shown with two outputs: one output to the next, downstream shift register and another output to a canonizer register. It is noted that the two outputs have the same value.

With a typical reversible BCH encoder, the outputs of the BCH parity shift registers (702a-702c) would be output as the parity. However, in this hash generation application, the output of the downstream parity registers (702c), shown as hash A (704), and the output of the upstream parity registers (702a), shown as hash B (706), are passed to a collection of canonizer registers (708) which in this example are two-bit registers (e.g., the size of one symbol) with input adders. For example, the output of the first register (710) and the output of the last register (712) are passed to the same canonizer register (714). The outputs (i.e., sums) of the canonizer registers (708) are canonized hashes and may be used (as example) to perform a lookup in a hash table.

Due to the symmetric nature of the generator polynomial, if a first string is used as the input string, hash A (704) would be a first hash (e.g., corresponding to the first string) and hash B (706) would be a second hash (e.g., corresponding to a second string that is a reverse complement of the first string). If the second string is used as the input string, the hashes would be swapped so that hash A (704) would be the second hash and hash B (706) would be the first hash. Since sum(hash A, hash B)=sum(hash B, hash A), a canonized hash is produced and the same hash will be generated, regardless of whether the first string or the counterpart second string is input to the system.

In some embodiments, it is desirable to use a generator polynomial with coefficients limited to 0 or 1 (as in the exemplary BCH(255, 238) generator polynomial) so that no multiplication (which computationally and/or processing resource-wise is not insignificant) needs to occur before the values are input to the canonizer registers (708). For example, suppose some of the terms had a GF(4) coefficient of 10. If so, the values propagated through the BCH parity shift registers (702a-702c) would not necessarily be "flipped" or mirrored versions of each other for the first string and the second string. To account for this, at least some of the outputs of the BCH parity shift registers (702a-702c) would need to be multiplied before those values are passed to the canonizer registers (708). With a generator polynomial that only has coefficients of 0 or 1, this multiplication step can be avoided.

As shown here, in some embodiments, using a reversible hash generator to generate a determinative hash (e.g., at step 102 in FIG. 1) includes using a reversible BCH encoder that generates a parity that includes a first portion (e.g., hash A (704)) and a second and non-overlapping portion (e.g., hash B (706)), where the determinative hash is based at least in part on the first portion of the parity and determining whether at least one of the first string or the second string is stored in the memory (e.g., at step 104 in FIG. 1) includes generating a canonized hash based at least in part on the first portion of the parity and the second and non-overlapping portion of the parity. As described above, there may need to be some scaling performed before the first and second portions of the parity are used to generate the canonized hash if the coefficients of the generator polynomial include coefficients other than 0 and 1. In various embodiments, generating the canonized hash includes combining two values to produce a third value as the canonized hash (e.g., summing) or selecting one of the values to be the canonized hash (e.g., selecting a maximum or largest value).

It is noted that in this particular example, the output of the center BCH parity register (702b) is not used to generate the canonized hash (i.e., there is no output from that register to one of the canonizer registers). This is because the length of the parity in this example is 17 symbols long and is therefore an odd length. With an even-length parity, the entire parity would be used to generate the canonized hash without ignoring any portion of the parity.

In some embodiments, a sliding window is used to systematically perform hash table lookups by generating rolling hashes. The following figures show an example of this and how the block diagram of FIG. 7 may be modified to generate rolling hashes.

Figure 8A:
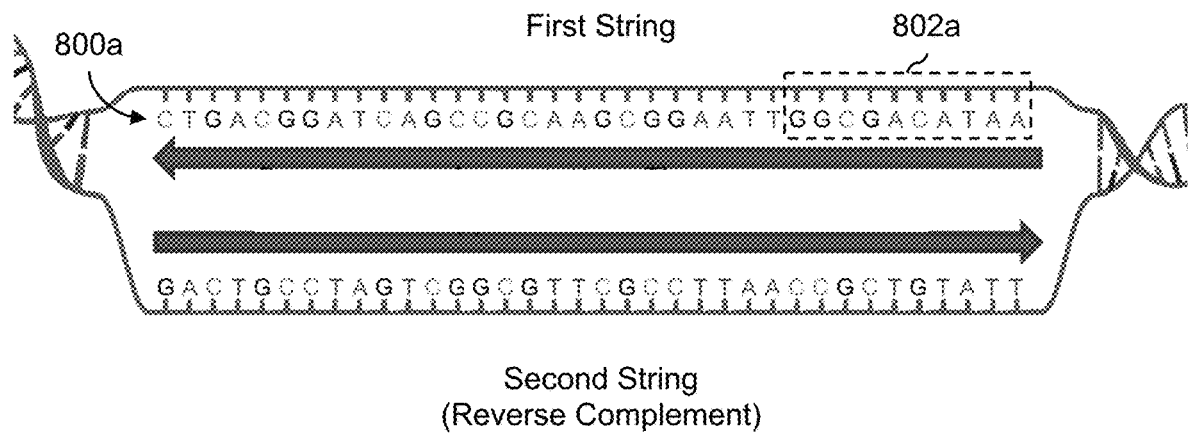
FIG. 8A is a diagram illustrating an embodiment of a sliding window applied to a string of DNA at a first point in time.

FIG. 8A is a diagram illustrating an embodiment of a sliding window applied to a string of DNA at a first point in time. In the example shown, a sliding window (802a) is applied to the first string of DNA (800a) so that the $1^{st}$ through $10^{th}$ symbols of the first string are windowed or otherwise selected. (In this particular example, the window size is 10 symbols or nucleobases long, but in some other embodiments, other window sizes are used.) For this portion of the first string that is within the sliding window (802a), a hash is generated. The window is then shifted one symbol or nucleobase over, as shown in the next figure.

Figure 8B:
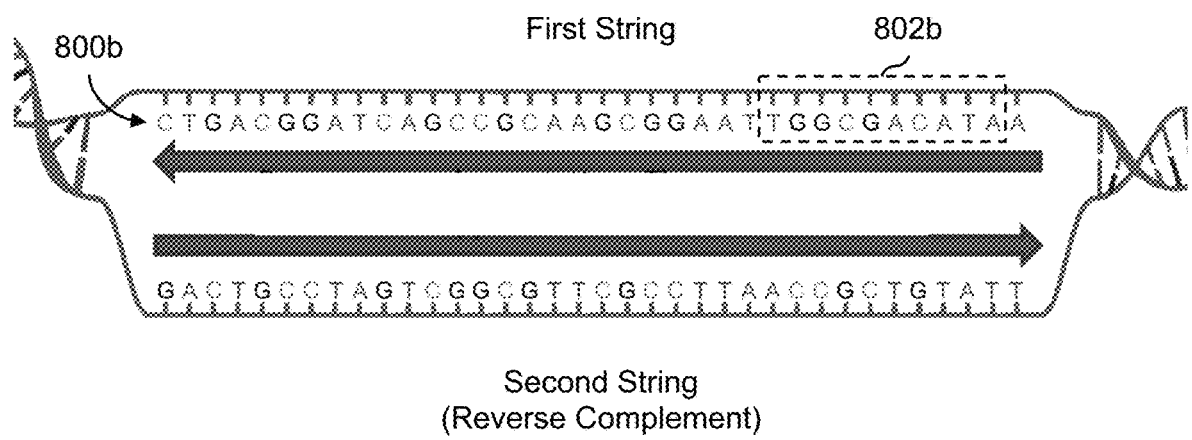
FIG. 8B is a diagram illustrating an embodiment of a sliding window applied to a string of DNA at a second point in time.

FIG. 8B is a diagram illustrating an embodiment of a sliding window applied to a string of DNA at a second point in time. In the state shown here, the sliding window (802b) has shifted one symbol over within the first string of DNA (800b) so that the $2^{nd}$ through $11^{th}$ symbols of the first string are selected. As before, a hash is generated for the symbols within the window. This process is repeated from the beginning to the end of the string and the resulting hashes are referred to herein as rolling hashes. Rolling hashes may be useful in applications or environments where the sample set of material can come in different sizes and/or in fragments. By using rolling hashes, the hash table is systematically consulted to determine if the received string (or some portion thereof) is already stored and/or has already been analyzed.

The following figure shows how the example of FIG. 7 may be modified to generate rolling hashes with a window size of 238 (e.g., to fit the k value of the exemplary BCH(255, 238) code).

Figure 9:
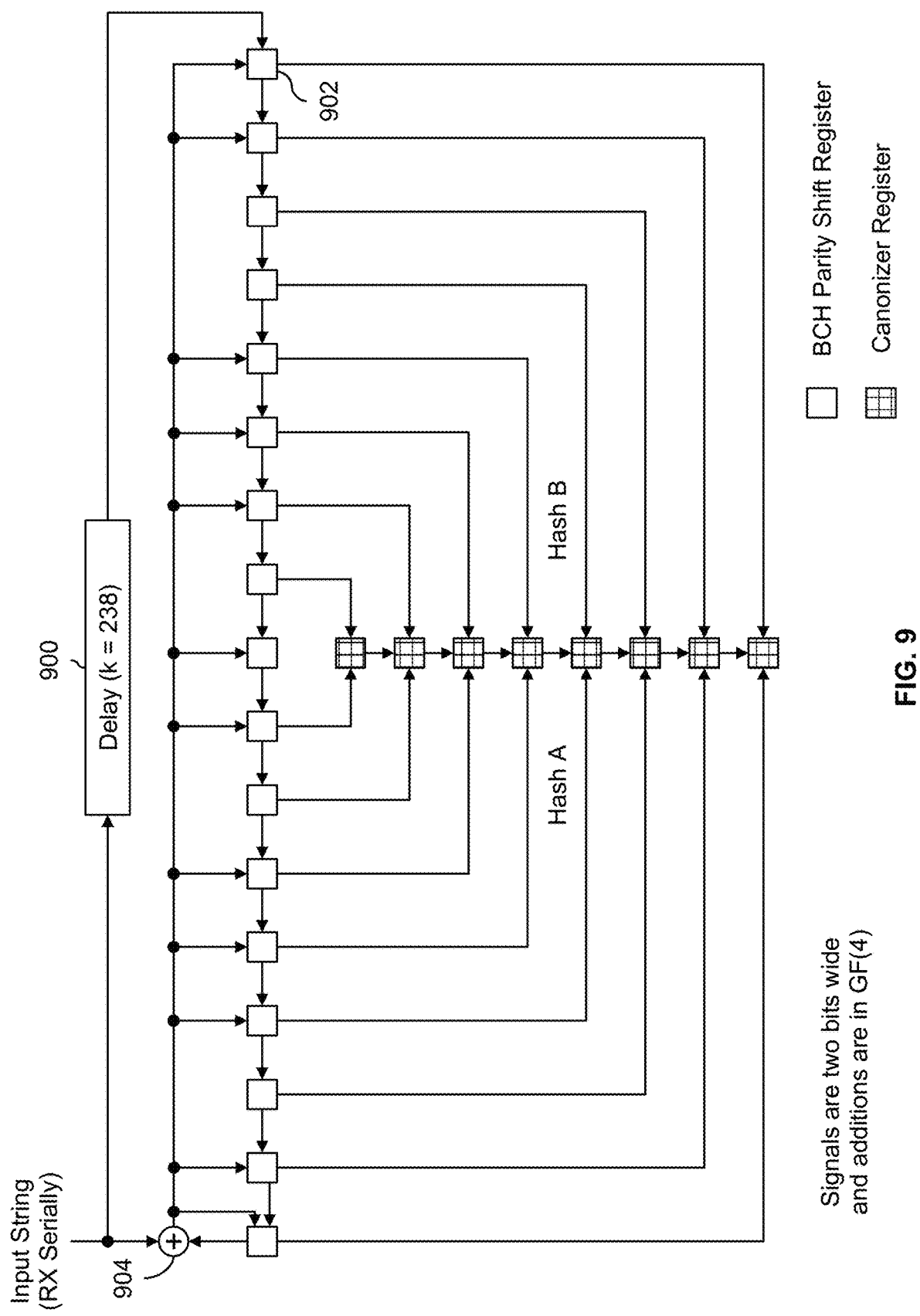
FIG. 9 is a block diagram illustrating an embodiment of a reversible BCH encoder configured to generate rolling hashes.

FIG. 9 is a block diagram illustrating an embodiment of a reversible BCH encoder configured to generate rolling hashes. In the example shown, the exemplary block diagram is similar to FIG. 7 and for brevity some of the blocks are not described herein. In this example, there is a delay block (900) which inputs the input string (e.g., serially) and outputs delayed symbols of the input string (e.g., one at a time) to the first register (902) in the string of BCH parity shift registers. For example, after taking 238 clock cycles to propagate through the delay block (900), the first symbol of the input string would be output by the delay block. Then, on the next clock cycle, the delay block (900) would output the $2^{nd}$ symbol of the input string and so on. The length of the delay block is selected to match the k value and/or window size, which in this example is 238. For other window sizes (e.g., FIGS. 8A and 8B have an exemplary window size or k of 10), the size of the delay block (900) is adjusted accordingly.

During the first 238 clock cycles, the symbols of the input string are still making their way through the delay block (900). As such, during that initial period, the delay block (900) is configured to output a value that is neutral and/or has no effect on downstream logic. For example, since the BCH parity shift registers perform addition, the delay block is configured to output a 0 during this initial period since a 0 does not change or otherwise affect a sum. This permits the first 238 symbols (corresponding to a first window) to be input serially into the system and a corresponding first parity value (from which a first canonized and rolling hash value is generated) without the delay block affecting that process.

Once the parity and canonized hash are generated for the first window, the window is (e.g., conceptually) shifted over one symbol so that the $1^{st}$ symbol is excluded from parity generation and the $239^{th}$ symbol is included. The delay block (900) accomplishes this by reintroducing the $1^{st}$ symbol back into the system for the purposes of removing the $1^{st}$ symbol from parity generation when the $239^{th}$ symbol is clocked into the system. For example, when the $239^{th}$ symbol is clocked in and observed at the input of the adder (904) at the same time when the $239^{th}$ symbol has made its way through the delay block (900) is observed at the input of the first BCH parity shift registers (902). This effectively removes or subtracts the $1^{st}$ symbol from being used in parity generation while adding the $239^{th}$ symbol so that only the $2^{nd}$ through $239^{th}$ symbols are used to generate the parity, which in turn is used to generate a rolling and canonized hash. This configuration is permitted or otherwise enabled by the cyclic property of BCH codes and may not necessarily work with all kinds of codes.

This process repeats for the next window where the $240^{th}$ symbol is input into the system at the same time that the delay block (900) reintroduces the $2^{nd}$ symbol in order to remove the $2^{nd}$ symbol from being used in generating the parity and canonized hash.

As shown here, in some embodiments, using a reversible hash generator to generate a determinative hash (e.g., at step 102 in FIG. 1) includes using a reversible BCH encoder that generates a parity that includes a first portion (e.g., hash A (704)) and a second and non-overlapping portion (e.g., hash B (706)), where the determinative hash is based at least in part on the first portion of the parity and determining whether at least one of the first string or the second string is stored in the memory (e.g., at step 104 in FIG. 1) includes generating a canonized hash based at least in part on the first portion of the parity and the second and non-overlapping portion of the parity and where the canonized hash includes a rolling hash.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a first string, having a first string value, that is associated with a sample set of material, wherein a second string, having a complementary value relative to the first string value, is also associated with the sample set of material;
   use a reversible hash generator to generate a determinative hash using the first string value, wherein a second hash, corresponding to the second string, is able to be determined directly from the determinative hash and without the reversible hash generator processing the complementary value of the second string; and
   determine whether at least one of the first string or the second string is stored in a memory using the determinative hash.

2. The method of claim 1, wherein the second string includes a reverse complement of the first string.

3. The method of claim 1, wherein determining whether at least one of the first string or the second string is stored in the memory includes:
   generating a canonized hash, having a canonized hash value, based at least in part on the determinative hash, wherein the canonized hash value is the same value for the first string and the second string; and
   performing a hash table lookup, including by sending the canonized hash to a hash table.

4. The method of claim 1, wherein determining whether at least one of the first string or the second string is stored in the memory includes:
   generating a canonized hash, having a canonized hash value, based at least in part on the determinative hash, wherein the canonized hash value is the same value for the first string and the second string; and
   performing a hash table lookup, including by sending the canonized hash to a hash table, wherein generating the canonized hash includes:
   generating, directly from the determinative hash, a second hash that corresponds to the second string; and
   using the determinative hash and the second hash to generate the canonized hash.

5. The method of claim 1, wherein using the reversible hash generator to generate the determinative hash includes using a reversible Bose-Chaudhuri-Hocquenghem (BCH) encoder that generates a parity, wherein the determinative hash is based at least in part on the parity.

6. The method of claim 1, wherein:
   using the reversible hash generator to generate the determinative hash includes using a reversible Bose-Chaudhuri-Hocquenghem (BCH) encoder that generates a parity that includes a first portion and a second and non-overlapping portion, wherein the determinative hash is based at least in part on the first portion of the parity; and
   determining whether at least one of the first string or the second string is stored in the memory includes generating a canonized hash based at least in part on the first portion of the parity and the second and non-overlapping portion of the parity.

7. The method of claim 1, wherein:
   using the reversible hash generator to generate the determinative hash includes using a reversible Bose-Chaudhuri-Hocquenghem (BCH) encoder that generates a parity that includes a first portion and a second and non-overlapping portion, wherein the determinative hash is based at least in part on the first portion of the parity; and
   determining whether at least one of the first string or the second string is stored in the memory includes generating a canonized hash based at least in part on the first portion of the parity and the second and non-overlapping portion of the parity, wherein generating the canonized hash includes combining a first value that is based at least in part on the first portion of the parity and a second value that is based at least in part on the second and non-overlapping portion of the parity.

8. The method of claim 1, wherein:
   using the reversible hash generator to generate the determinative hash includes using a reversible Bose-Chaudhuri-Hocquenghem (BCH) encoder that generates a parity that includes a first portion and a second and non-overlapping portion, wherein the determinative hash is based at least in part on the first portion of the parity; and
   determining whether at least one of the first string or the second string is stored in the memory includes generating a canonized hash based at least in part on the first portion of the parity and the second and non-overlapping portion of the parity, wherein:
   generating the canonized hash includes combining a first value that is based at least in part on the first portion of the parity and a second value that is based at least in part on the second and non-overlapping portion of the parity; and
   the canonized hash includes a rolling hash.

9. A system, comprising:
   a memory that is configured to store strings; and
   a hash table controller that is configured to:
   receive a first string, having a first string value, that is associated with a sample set of material, wherein a second string, having a complementary value relative to the first string value, is also associated with the sample set of material;
   use a reversible hash generator to generate a determinative hash using the first string value, wherein a second hash, corresponding to the second string, is able to be determined directly from the determinative hash and without the reversible hash generator processing the complementary value of the second string; and determine whether at least one of the first string or the second string is stored in the memory using the determinative hash.

10. The system of claim 1, wherein the second string includes a reverse complement of the is first string.

11. The system of claim 1, further comprising a hash table, wherein the hash table controller is configured to determine whether at least one of the first string or the second string is stored in the memory, including by:
generating a canonized hash, having a canonized hash value, based at least in part on the determinative hash, wherein the canonized hash value is the same value for the first string and the second string; and
performing a hash table lookup, including by sending the canonized hash to the hash table.

12. The system of claim 1, further comprising a hash table, wherein the hash table controller is configured to determine whether at least one of the first string or the second string is stored in the memory, including by:
generating a canonized hash, having a canonized hash value, based at least in part on the determinative hash, wherein the canonized hash value is the same value for the first string and the second string; and
performing a hash table lookup, including by sending the canonized hash to the hash table, wherein generating the canonized hash includes:
generating, directly from the determinative hash, a second hash that corresponds to the second string; and
using the determinative hash and the second hash to generate the canonized hash.

13. The system of claim 9, wherein the hash table controller is configured to use the reversible hash generator to generate the determinative hash, including by using a reversible Bose-Chaudhuri-Hocquenghem (BCH) encoder that generates a parity, wherein the determinative hash is based at least in part on the parity.

14. The system of claim 9, wherein:
the hash table controller is configured to use the reversible hash generator to generate the determinative hash, including by using a reversible Bose-Chaudhuri-Hocquenghem (BCH) encoder that generates a parity that includes a first portion and a second and non-overlapping portion, wherein the determinative hash is based at least in part on the first portion of the parity; and
the hash table controller is configured to determine whether at least one of the first string or the second string is stored in the memory, including by generating a canonized hash based at least in part on the first portion of the parity and the second and non-overlapping portion of the parity.

15. The system of claim 9, wherein:
the hash table controller is configured to use the reversible hash generator to generate the determinative hash, including by using a reversible Bose-Chaudhuri-Hocquenghem (BCH) encoder that generates a parity that includes a first portion and a second and non-overlapping portion, wherein the determinative hash is based at least in part on the first portion of the parity; and
the hash table controller is configured to determine whether at least one of the first string or the second string is stored in the memory, including by generating a canonized hash based at least in part on the first portion of the parity and the second and non-overlapping portion of the parity, wherein generating the canonized hash includes combining a first value that is based at least in part on the first portion of the parity and a second value that is based at least in part on the second and non-overlapping portion of the parity.

16. The system of claim 9, wherein:
the hash table controller is configured to use the reversible hash generator to generate the determinative hash, including by using a reversible Bose-Chaudhuri-Hocquenghem (BCH) encoder that generates a parity that includes a first portion and a second and non-overlapping portion, wherein the determinative hash is based at least in part on the first portion of the parity; and
the hash table controller is configured to determine whether at least one of the first string or the second string is stored in the memory, including by generating a canonized hash based at least in part on the first portion of the parity and the second and non-overlapping portion of the parity, wherein:
generating the canonized hash includes combining a first value that is based at least in part on the first portion of the parity and a second value that is based at least in part on the second and non-overlapping portion of the parity; and
the canonized hash includes a rolling hash.

17. A computer program product embodied in a non-transitory computer readable medium and comprising computer instructions for:
receiving a first string, having a first string value, that is associated with a sample set of material, wherein a second string, having a complementary value relative to the first string value, is also associated with the sample set of material;
use a reversible hash generator to generate a determinative hash using the first string value, wherein a second hash, corresponding to the second string, is able to be determined directly from the determinative hash and without the reversible hash generator processing the complementary value of the second string; and
determine whether at least one of the first string or the second string is stored in a memory using the determinative hash.

18. The computer program product of claim 17, wherein the computer instructions for determining whether at least one of the first string or the second string is stored in the memory include computer instructions for:
generating a canonized hash, having a canonized hash value, based at least in part on the determinative hash, wherein the canonized hash value is the same value for the first string and the second string; and
performing a hash table lookup, including by sending the canonized hash to a hash table.

19. The computer program product of claim 17, wherein the computer instructions for using the reversible hash generator to generate the determinative hash include computer instructions for using a reversible Bose-Chaudhuri-Hocquenghem (BCH) encoder that generates a parity, wherein the determinative hash is based at least in part on the parity.

20. The computer program product of claim 17, wherein:
the computer instructions for using the reversible hash generator to generate the determinative hash include computer instructions for using a reversible Bose-Chaudhuri-Hocquenghem (BCH) encoder that generates a parity that includes a first portion and a second and non-overlapping portion, wherein the determinative hash is based at least in part on the first portion of the parity; and the computer instructions for determining whether at least one of the first string or the second string is stored in the memory include computer instructions for generating a canonized hash based at least in part on the first portion of the parity and the second and non-overlapping portion of the parity, wherein generating the canonized hash includes combining a first value that is based at least in part on the first portion of the parity and a second value that is based at least in part on the second and non-overlapping portion of the parity.

* * * * *

UNITED STATES PATENT AND TRADEMARK OFFICE
CERTIFICATE OF CORRECTION

PATENT NO. : 10,965,467 B1
APPLICATION NO. : 17/069471
DATED : March 30, 2021
INVENTOR(S) : Jonathan Darrel Coker, Travis Roger Oenning and Balamurugan Anandan It is certified that error appears in the above-identified patent and that said Letters Patent is hereby corrected as shown below:

In the Claims

In Column 13, Line(s) 8, Claim 10, delete "claim 1" and insert --claim 9--, therefor.
In Column 13, Line(s) 10, Claim 11, delete "claim 1" and insert --claim 9--, therefor.
In Column 13, Line(s) 20, Claim 12, delete "claim 1" and insert --claim 9--, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*